United States Patent [19]

Santiago

[11] Patent Number: 4,766,329

[45] Date of Patent: Aug. 23, 1988

[54] AUTOMATIC PUMP CONTROL SYSTEM

[76] Inventor: Elias Santiago, P.O. Box 3199, Bayamon, P.R. 00621-3199

[21] Appl. No.: 95,815

[22] Filed: Sep. 11, 1987

[51] Int. Cl.⁴ ............................................. H01H 35/18
[52] U.S. Cl. ...................................... 307/118; 307/116; 307/117; 417/36; 73/304 C; 340/620; 340/603
[58] Field of Search ......................... 307/116, 117, 118; 73/304 R, 304 C, 308, 301, 295, 290 V, 291; 340/620.59, 618, 621, 603, 625, 605; 324/65 P, 61 QS, 61 QL, 61 R; 137/392, 389; 417/7, 8, 2, 12, 36, 40, 44, 63, 38; 200/84 C; 361/23, 178; 318/482, 473, 325

[56] References Cited

U.S. PATENT DOCUMENTS

| | | | |
|---|---|---|---|
| 3,553,575 | 1/1971 | Shea | 73/304 C |
| 3,800,205 | 3/1974 | Zalar | 417/36 X |
| 4,061,442 | 12/1977 | Clark et al. | 417/36 |
| 4,171,932 | 10/1979 | Miller | 307/118 |
| 4,205,237 | 5/1980 | Miller | 307/118 |
| 4,213,340 | 7/1980 | Cheng | 73/304 |
| 4,586,033 | 4/1986 | Andrejasich | 340/603 |
| 4,600,844 | 7/1986 | Atkins | 307/118 |
| 4,628,302 | 12/1986 | Barr et al. | 340/620 |

Primary Examiner—William M. Shoop, Jr.
Assistant Examiner—Paul Ip
Attorney, Agent, or Firm—Oltman and Flynn

[57] ABSTRACT

A water pump control system, such as for a boat, including a battery operated main motor-and-pump unit and a backup motor-and-pump unit. A pump turn-on transistor operates a relay to turn on the main motor-and-pump unit when the water level rises to a high level. A touch switch may be used to turn on the pump turn-on transistor independent of the water level. A pump turn-off transistor, which is turned on by the relay, keeps the main motor-and-pump unit on until the water level drops to a low water level. A backup motor-and-pump unit comes on if the main motor-and-pump unit has not come on after the pump turn-on transistor has been turned on.

17 Claims, 1 Drawing Sheet

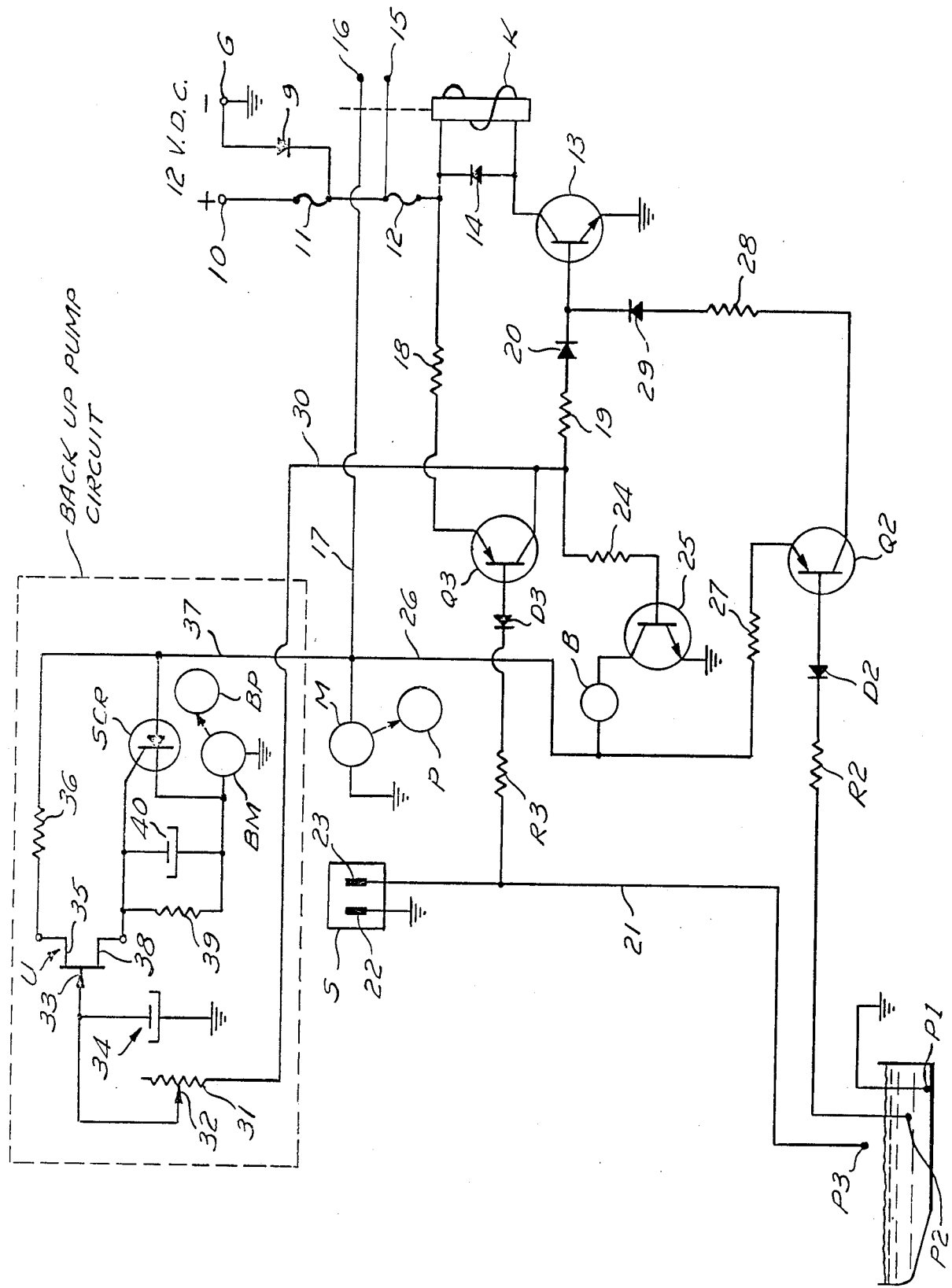

AUTOMATIC PUMP CONTROL SYSTEM

SUMMARY OF THE INVENTION

This invention relates to a system for controlling the automatic pumping of water out of a boat or another site, such as rain water that may accumulate while a boat is not in use.

An important object of this invention is to provide a novel automatic, battery-powered system for pumping water from a boat or other site in which no current is drawn from the battery except when the pump is in operation.

Another important object of this invention is to provide a novel automatic system for pumping water from a boat or other site which has, in addition to a main motor-and-pump unit, a backup motor-and-pump unit which is energized in the event that the main motor-and-pump unit does not come on when it is supposed to.

Another object of this invention is to provide a novel automatic system for pumping water from a boat or other site which provides a signal of brief duration when pumping is started. If the main motor-and-pump unit fails to operate, the signal will remain on until the backup motor-and-pump unit has begun pumping the water out.

Another object of this invention is to provide a novel automatic, battery-powered system for pumping water from a boat or other site which has three electrically conductive probes exposed to water, namely, a high water level probe, a low water level probe and a grounded probe, and arranged so that there is no current drain from the battery except when water is being pumped out.

Preferably, the present system has:
 a main motor-and-pump unit;
 a backup motor-and-pump unit;
 a high water level probe;
 a low water level probe;
 a grounded probe;
 a pump turn-on transistor connected to the battery and the high water level probe to be turned on when water reaches a predetermined high level and to be turned off when the water is below that level;
 a relay having a coil that is initially energized from the battery through the pump turn-on transistor and having a set of normally-open contacts connected between the battery and the main motor-and-pump unit so as to turn on the main motor-and-pump unit when the relay coil is energized;
 a pump turn-off transistor connected to the battery through the relay contacts and connected to the low water level probe so as to provide a holding circuit to keep the relay coil energized independent of the pump turn-on transistor while the water is dropping from the high high water level probe down to the low water level probe;
 an audible signalling device and a switching transistor connected to the battery through the relay contacts, with the switching transistor connected to be turned off by the pump turn-on transistor when it goes off, thereby turning off the signalling device when the water level drops below the high water level probe;
 R-C time delay circuit connected to start a timing interval when the pump turn-on transistor comes on and to interrupt that interval when that transistor goes off;
 a unijunction transistor connected between that delay circuit and the relay contacts to turn on at the completion of the time interval;
 and a silicon controlled rectifier connected to the unijunction transistor and the motor of the backup motor-and-pump unit to turn that unit on when the unijunction transistor comes on.

Further objects and advantages of this invention will be apparent from the following detailed description of a presently preferred embodiment which is illustrated schematically in the accompanying drawings.

DESCRIPTION OF THE DRAWING

The single FIGURE of the drawing is a schematic electrical circuit diagram of a presently-preferred embodiment of this invention.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

The energy source for the entire circuit, including the motor M for the main pump and the motor B for the backup pump, is a 12 volt battery having a positive power supply terminal 10 and a grounded terminal G. The positive battery terminal is connected through successive fuses 11 and 12 to the upper terminal of a relay coil K whose lower terminal is connected to ground through the collector-emitter path of an NPN transistor 13. A rectifier diode 14 is connected across relay coil K with its cathode connected directly to fuse 12 and its anode connected directly to the collector of transistor 13. The juncture between fuses 11 and 12 is connected through a rectifier diode 9 to the grounded battery terminal.

Coil K is part of a relay having a normally-open set of contacts 15 and 16 which close in response to the energization of coil K. Contact 15 is connected directly to the juncture between fuses 11 and 12. Contact 16 is connected through line 17 to one terminal of the main pump motor M, the opposite terminal of which is grounded. Motor M drives a main pump P, which is located to pump water out of a boat or other site, such as rain water that may accumulate while a boat is not in use. Motor M and pump P constitute the main motor-and-pump unit in the present system.

The initial energization of relay coil K through transistor 13 is under the control of a normally non-conductive, PNP, pump turn-on transistor Q3. The emitter of Q3 is connected to fuse 12 and the upper terminal of relay K through a resistor 18. The collector of Q3 is connected to the base of transistor 13 through a resistor 19 and a rectifier diode 20, connected in series. The base of Q3 is connected through a rectifier diode D3, a resistor R3 and line 21 to a high water level probe P3 positioned to sense a high water level in the boat or other site for the present pumping system.

A low water level probe P2 is at a predetermined lower level below the high water level probe P3 and about 1 mm. higher than a grounded third probe P1, which is positioned directly on the bottom of the boat.

All three probes P1, P2 and P3 are of electrically conductive material directly exposed to the water so that the water provides an electrically conductive path between the low water level probe P2 and the grounded probe P1 when the water level is at least as high as P2 and provides an electrically conductive path between the high water level probe P3 and the grounded probe P1 when the water level is at least as high as P3.

A manually-operated touch switch S has a grounded terminal 22 and another terminal 23, which is connected to the juncture between line 21 and resistor R3. Switch S is a well-known type of touch switch (without moving contacts) which when touched by a person's finger completes a circuit, in this case, a circuit to ground so as to turn on transistor Q3. If desired, a normally open push-button switch might be used in place of the touch switch S.

The collector of the pump turn-on transistor Q3 is connected through a resistor 24 to the base of an NPN switching transistor 25 having a grounded emitter. The collector of the switching transistor 25 is connected through an electrically operated buzzer B and line 26 to line 17. The energization of buzzer B and switching transistor 25 is under the control of both the pump turn-on transistor Q3 and relay contacts 15 and 16, as explained hereinafter.

A PNP, normally non-conductive, pump turn-off transistor Q2 has its emitter connected through a resistor 27 to line 26. The collector of Q2 is connected through a resistor 28 and a rectifier diode 29 to the base of transistor 13. The base of Q2 is connected through a rectifier diode D2 and a resistor R2 to the low water level probe P2. As explained hereinafter, Q2 provides a holding circuit to keep relay coil K energized independent of Q3.

The collector of the pump turn-on transistor Q3 also is connected through a line 30 which provides one terminal of a backup pump circuit, shown inside the dashed-line enclosure in the drawing. Line 30 is connected to one end of a variable resistor 31, which has a slidable or otherwise variable contact 32 connected directly to the emitter 33 of a unijunction transistor U. A capacitor 34 is connected between emitter 33 and ground. Resistor 31–32 and capacitor 34 form a resistance-capacitance time delay circuit with a time constant that is determined by the setting of the variable resistor.

The unijunction U has a first base electrode 35 connected through a resistor 36 and a line 37 to line 17. Line 37 provides a second terminal of the backup pump circuit.

The unijunction U has a second base electrode 38 connected directly to the gate electrode of a silicon controlled rectifier SCR, the anode of which is connected directly to line 37. The cathode of SCR is connected to one terminal of the motor BM for a backup pump BP, also positioned to pump water out of the boat or other site. The opposite terminal of motor BM is grounded. Motor BM and pump BP constitute a backup motor-and-pump unit in the present system. A resistor 39 and a capacitor 40 are connected in parallel with each other between the gate and the cathode of SCR.

OPERATION

There is no current drain from the battery as long as the water level is rising to the highest probe P3 and touch switch S is not closed. Under these circumstances, relay coil K is de-energized because transistor 13 is off. Transistor Q3 is off and therefore draws no current from the battery. Relay contacts 15 and 16 are open because relay coil K is de-energized, and consequently there can be no battery current via line 17 to pump motor M, or to the backup pump motor BM or any other component of the backup pump circuit, or to buzzer B and transistor 25, or to transistor Q2.

Assuming that the water level is low initially, nothing happens until the water level rises to the high water level probe P3. Typically, this happens when it rains on a boat. When the water contacts the high probe P3, it reduces the voltage on the base of the pump turn-on transistor Q3 by way of diode D3, resistor R3, line 21 and the conductive path through the water from the high water level probe P3 to the grounded probe P1. The lowering of its base voltage turns on transistor Q3, which conducts current through its emitter-collector path as follows: from the positive battery terminal 10 through fuses 11 and 12, resistor 18, the emitter-collector path of Q-3, resistor 19, diode 20 and the base-emitter path of transistor 13 to ground. This turns on transistor 13.

When turned on, transistor Q3 also increases the voltage on the base of switching transistor 25 through resistor 24, thus biasing transistor 25 for conduction.

With transistor 13 turned on by transistor Q3, the relay coil K is energized as follows: from the positive battery terminal 10 through fuses 11 and 12, through the relay coil K, and through the collector-emitter path of transistor 13 to ground.

The energization of relay coil K causes it to close the normally-open relay contacts 15 and 16, thus applying positive battery voltage via lines 17 and 26 and resistor 27 to the emitter of the pump turn-off transistor Q2. At this time the base of Q2 is connected to ground through diode D2, resistor R2 and the conductive path through the water between the low water level probe P2 and the grounded probe P1. Consequently, transistor Q2 turns on in response to the closing of relay contacts 15 and 16, conducting current via its emitter-collector path, resistor 28 and diode 29 to the base of transistor 13. Thus, the pump turn-off transistor Q2 provides a holding circuit to keep transistor 13 on and relay coil K energized independent of the pump turn-on transistor Q-3.

The closing of relay contacts 15 and 16 turns on the main pump motor M through the following energization circuit: from the positive battery terminal 10 through fuse 11, the now-closed relay contacts 15 and 16, line 17, and through the main pump motor M to ground. This motor turns on the main pump so the water level now drops below the high water level probe P3, which causes the pump turn-on transistor Q3 to turn off. However, transistor 13 stays on and keeps relay coil K energized because of its holding circuit through the pump turn-off transistor Q2 until the water level drops below the low water level probe P2.

The closing of relay contacts 15 and 16 also turns on switching transistor 25 via lines 17 and 26 and buzzer B. As already stated, the base voltage in transistor 25 went up when transistor Q3 went on. The buzzer B produces an audible signal and transistor 25 stays on only for the brief time between when the pump motor M turns on and when the water level drops below the high water level probe P3. Both buzzer B and switching transistor 25 go off with the pump turn-on transistor Q3 when the water level goes below the high water level probe P3.

The pump motor M also can be turned on by touching the touch switch S, which turns on transistor Q3 by connecting its base to ground via diode D3, resistor R3 and the contacts of switch S. A person may do this if the water level in the boat, due to rain for example, is not as high as the high water level probe P3 but the person wants to pump it out so that the boat will not have to carry unnecessary weight when under way.

When the pump turn-on transistor Q3 is turned on, either in response to a water level as high as high water level probe P3 or in response to the touching of manual switch S, it applies a positive potential via line 30 and variable resistor 31-32 to capacitor 34. With relay contacts 15 and 16 closed, the positive battery voltage is applied via lines 17 and 37 and resistor 36 to the upper base 35 of unijunction U. When the voltage across this capacitor 34 reaches about 90% of the voltage on base 35 of unijunction U, the unijunction turns on and the current through its base 38 goes to the gate electrode of SCR, turning it on. With the relay contacts 15 and 16 closed, battery current flows via lines 17 and 37 through the anode-cathode path of SCR and through the motor BM for the backup pump to ground.

Note that the backup pump motor BM comes on only if the pump turn-on transistor Q3 has stayed on longer than the R-C time constant determined by adjustable resistor 31-32 and capacitor 34. This will not happen if the main pump has come on and has begun lowering the water level below the high water level probe P3 because in that case Q3 will have been turned off before unijunction U would be turned on. That is, the backup pump BP comes on only after a time interval, determined by the values of adjustable resistor 31-32 and capacitor 34, during which the main pump P should have started and lowered the water level enough to turn off Q3. Thus, the fact that Q3 has stayed on indicates that the main pump is not operating properly.

I claim:

1. At a site having a battery, a water pump control system comprising:
    a battery-operated main motor-and-pump unit for pumping water out of the site;
    an electrically conductive high water level probe positioned to be exposed to water at the site at least as high as a predetermined high level;
    an electrically conductive low water level probe positioned to be exposed to water at the site at least as high as a lower level than said high level;
    a grounded electrically conductive probe positioned to be exposed to water at the site touching said low water level probe;
    a normally non-conductive pump turn-on transistor connected between the battery and said high water level probe to be turned on when water at the site touches said high water level probe and to be turned off when the water level at the site drops below said high water level probe;
    a relay comprising a coil and a set of normally-open contacts which close when the coil is energized, said coil being connected to the battery and to said pump turn-on transistor to be de-energized before said pump turn-on transistor turns on and to be energized when said pump turn-on transistor turns on, said contacts being connected between the battery and said main motor-and-pump unit to turn on said main motor-and-pump unit when said contacts close;
    and a normally non-conductive pump turn-off transistor connected to the battery through said relay contacts and connected to said low water level probe to be turned on by the closing of said relay contacts and to remain on as long as said relay contacts remain closed and the water at the site touches said low water level probe, said pump turn-off transistor being connected to said relay coil to hold said coil energized independent of said pump turn-on transistor while the water level at the site is dropping from said high water level probe to said low water level probe.

2. A water pump control system according to claim 1 and further comprising:
    a signalling device connected to produce a signal in response to the closing of said relay contacts and to stop producing said signal when said pump turn-on transistor is turned off.

3. A water pump control system according to claim 1 and further comprising:
    a signalling device and a switching transistor connected in series with each other across the battery through said relay contacts;
    said pump turn-on transistor being connected to said switching transistor to bias said switching transistor for conduction when said pump turn-on transistor is on;
    said relay being operative by the closing of its contacts to turn on said signalling means and said switching transistor;
    and said pump turn-on transistor when it turns off being operative to turn off said signalling device and said switching transistor.

4. A water pump control system according to claim 3 and further comprising:
    a battery-operated backup motor-and-pump unit for pumping water out of the site;
    an R-C time delay circuit connected to said pump turn-on transistor to start a predetermined time delay interval when said pump turn-on transistor is turned on and to interrupt said interval when said pump turn-on transistor goes off;
    a unijunction transistor connected between said time delay circuit and said relay contacts to turn on at the completion of said predetermined time delay interval;
    and a controlled rectifier connected to said unijunction transistor and the motor of said backup motor-and-pump unit to turn on said backup motor-and-pump unit when said unijunction transistor turns on.

5. A water pump control system according to claim 1 and further comprising:
    a battery-operated backup motor-and-pump unit arranged to pump water out of the site;
    an R-C time delay circuit connected to said pump turn-on transistor to start a predetermined time delay interval when said pump turn-on transistor is turned on and to interrupt said interval when said pump turn-on transistor goes off;
    a unijunction transistor connected between said time delay circuit and said relay contacts to turn on at the completion of said predetermined time delay interval;
    and a controlled rectifier connected to said unijunction transistor and the motor of said backup motor-and-pump unit to turn on said backup motor-and-pump unit when said unijunction transistor turns on.

6. A water pump control system according to claim 1 and further comprising:

a battery-operated backup motor-and-pump unit for pumping water out of the site;

and means for turning on said backup motor-and-pump unit if said pump turn-on transistor fails to turn off within a predetermined time interval after it is turned on.

7. A water pump control system according to claim 2 and further comprising:

a battery-operated backup motor-and-pump unit arranged to pump water out of the site;

and means for turning on said backup motor-and-pump unit if said pump turn-on transistor fails to turn off within a predetermined time interval after it is turned on.

8. At a site having a battery, a water pump control system comprising:

a battery-operated main motor-and-pump unit for pumping water out of the site;

a battery-operated backup motor-and-pump unit for pumping water out of the site;

an electrically conductive high water level probe positioned to be exposed to water at the site at least as high as a predetermined high level;

a grounded electrically conductive probe positioned to be exposed to water at the site at a lower level than said high level;

a normally non-conductive pump turn-on transistor connected between the battery and said high water level probe to be turned on when water at the site touches said high water level probe and to be turned off when the water level at the site drops below said high water level probe;

a relay comprising a coil and a set of normally-open contacts which close when the coil is energized, said coil being connected to the battery and to said pump turn-on transistor to be de-energized before said pump turn-on transistor turns on and to be energized when said pump turn-on transistor turns on, said contacts being connected between the battery and said main motor-and-pump unit to turn on said main motor-and-pump unit when said contacts close;

and means for turning on said backup motor-and-pump unit if said pump turn-on transistor fails to turn off within a predetermined interval after it is turned on.

9. A water pump control system according to claim 8 and further comprising:

means for producing a signal while said pump turn-on transistor is on and said relay contacts are closed.

10. A water pump control system according to claim 8 and further comprising:

means responsive to the closing of said relay contacts for establishing a holding circuit to keep said relay coil energized independent of said pump turn-on transistor while the water level at the site drops below said high level.

11. A water pump control system according to claim 10 and further comprising:

an electrically conductive low water level probe positioned to be exposed to water at the site below said high water level probe and at least as high as said grounded probe;

and wherein:

said means for establishing said holding circuit is connected to said low water level probe to hold said relay coil energized as long as the water at the site touches said low water level probe.

12. At a site having a battery, a water pump control system comprising:

a battery-operated motor-and-pump unit for pumping water out of the site;

an electrically conductive high water level probe positioned to be exposed to water at the site at least as high as a predetermined high level;

an electrically conductive low water level probe positioned to be exposed to water at the site at least as high as a predetermined lower level;

means for turning on said motor-and-pump unit when water at the site rises to said high level;

means for turning off said motor-and-pump unit when the water level at the site drops from said high level to said lower level;

and means for preventing current drain from the battery while the water at the site is rising to said high level.

13. The system of claim 12 and further comprising: a signalling device;

means for turning on said signalling device in response to the water level rising to said high water level probe;

and means for turning off said signalling device in response to the water level dropping below said high level probe.

14. At a site having a battery, a water pump control system comprising:

a battery-operated motor-and-pump unit for pumping water out of the site;

an electrically conductive high water level probe positioned to be exposed to water at the site at least as high as a predetermined high level;

an electrically conductive low water level probe positioned to be exposed to water at the site at least as high as a lower level than said high level;

a grounded electrically conductive probe positioned to be exposed to water at the site touching said low water level probe;

means for preventing current drain from the battery through said low water level probe and the water at the site to said grounded probe while the water at the site is rising to said high level;

means for turning on said motor-and-pump unit when water at the site rises to said high level;

and means for turning off said motor-and-pump unit when the water level at the site drops from said high level to said lower level.

15. A water pump control system according to claim 1 and further comprising:

a touch switch connected to turn on said pump turn-on transistor when touched by a person.

16. A water pump control system according to claim 3 and further comprising:

a touch switch connected to turn on said pump turn-on transistor when touched by a person.

17. A water pump control system according to claim 11 and further comprising:

a touch switch connected to turn on said pump turn-on transistor when touched by a person.

* * * * *